US012791420B2

(12) United States Patent
Proff et al.

(10) Patent No.: US 12,791,420 B2
(45) Date of Patent: Nov. 10, 2026

(54) MICROCAPILLARY HOLDER, TEST SYSTEM AND PROCESS

(71) Applicant: HOFFMANN-LA ROCHE INC., Little Falls, NJ (US)

(72) Inventors: Christian Proff, Basel (CH); Alexander Klemin, Basel (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 330 days.

(21) Appl. No.: 18/549,424

(22) PCT Filed: Mar. 15, 2022

(86) PCT No.: PCT/EP2022/056619
§ 371 (c)(1),
(2) Date: Sep. 7, 2023

(87) PCT Pub. No.: WO2022/194821
PCT Pub. Date: Sep. 22, 2022

(65) Prior Publication Data

US 2024/0310237 A1 Sep. 19, 2024

(30) Foreign Application Priority Data

Mar. 15, 2021 (EP) .................................... 21162655

(51) Int. Cl.
*G01M 3/32* (2006.01)

(52) U.S. Cl.
CPC ................................. *G01M 3/3209* (2013.01)

(58) Field of Classification Search
None
See application file for complete search history.

(56) References Cited

U.S. PATENT DOCUMENTS 5,013,006 A * 5/1991 Furuse .................. G01M 3/007 251/8
6,595,040 B1 * 7/2003 Widt ....................... G01M 3/00 73/1.25
9,034,163 B1 * 5/2015 Wang ............... G01N 27/44756 204/601

FOREIGN PATENT DOCUMENTS

WO 2020104688 A1 5/2020

OTHER PUBLICATIONS

International Search Report and Written Opinion issued Jun. 28, 2022 in Intl. Appl. No. PCT/EP2022/056619.

* cited by examiner

*Primary Examiner* — Mark A Shabman
(74) *Attorney, Agent, or Firm* — MEDLER FERRO WOODHOUSE & MILLS PLLC

(57) ABSTRACT

A microcapillary holder is disclosed for holding a microcapillary during positive control physical container closure integrity testing of a packaging. The microcapillary holder includes a body with an elongated portion having a longitudinal axis. The body has a lateral circumference, a duct and a pass-through channel. The duct of the body extends along the longitudinal axis through the elongated portion. The duct of the body is dimensioned to receive the microcapillary. The pass-through channel of the body extends between the lateral circumference and the duct. A pCCI testing system and a process of positive control of a pCCI of a packaging are also disclosed.

18 Claims, 8 Drawing Sheets

MICROCAPILLARY HOLDER, TEST SYSTEM AND PROCESS

TECHNICAL FIELD

The present invention relates to a microcapillary holder for holding a microcapillary during positive control physical container closure integrity (pCCI) testing of a packaging, a pCCI testing system comprising such a microcapillary holder as well as to a respective process of positive control of a pCCI of a packaging.

BACKGROUND ART

Positive control generally relates to controlling the integrity of containers or packages having an intentional or known leak. Positive controls are used for a better understanding of the measurement system. In contrast, negative control relates to controlling integrity of containers or packages having no known leak, i.e. such containers or packages that were typically assembled using normally processed components.

The containers or packages to be controlled are usually in the form of a primary packaging such as a primary packaging of a drug or a pharmaceutical or chemical substance. Examples for such primary packaging are commonly used vials, cartridges or syringes.

The integrity of a container or package generally indicates the ability of keeping a content inside the respective container or package and of keeping detrimental environmental contaminants outside the respective container or package.

Leaks are typically perceived as holes or cracks of a certain diameter and length. The leakage is a measure of gas flow (in mass or volume or units) that passes through a leak path under specific conditions. Leakage of 1 [mbar xl/sec] is given when the pressure in a closed container of 1 liter rises or falls within 1 sec by 1 mbar.

A commonly used CCI test method is differential pressure (DP) method. This method is a pneumatic method with permanent leaks. It requires a headspace or liquid that vaporizes. Instant testing is possible with the DP method.

During pneumatic testing the sample typically is arranged in a sealed chamber. Then, either a vacuum or pressure is applied to the chamber. Appropriate sensors are used to monitor the pressure conditions in the chamber. If any gas exchange with the sample occurs, pressure conditions change which indicates a leak.

Other known CCI test methods include head space analysis (HSA), mass spectrometry (MS), high voltage (HVLD) and force sensor (FS).

In order to create positive controls, it is known to use microtubes (also referred to as microcapillaries) in order to simulate microholes or microorifices (i.e., representing the intentional or known leak) in the respective sample containers or packages. However, creating such positive controls is a delicate task. During the preparation and during the insertion of the microcapillaries in the samples, it is of utmost importance not to plug the microcapillaries or damage an end of the portion of the microcapillaries or even break the microcapillaries.

Another key factor is the attachment of the microcapillaries. If for instance a commonly known rubber stopper is used for attaching a microcapillary to a vial, there is a risk that the microcapillary is not sealed or not correctly sealed to the vial such that the respective content may transfer next to the microcapillary rather than inside of it. This is the case when the rubber stopper does not properly retract around the microcapillary and leaves a path for gas.

Therefore, there is a need for a device by means of which the handling of the microcapillaries may be facilitated and rendered more secure for the user and by means of which more reliable results may be achieved in pCCI testing.

DISCLOSURE OF THE INVENTION

According to the invention this need is settled by a microcapillary holder as it is defined by the features of independent claim 1, by a pCCI testing system as it is defined by the features of independent claim 9 and by a process as it is defined by the features of independent claim 14. Preferred embodiments are subject of the dependent claims.

In one aspect, the present invention relates to a microcapillary holder for holding a microcapillary during positive control physical container closure integrity (pCCI) testing of a packaging. The microcapillary holder includes a body with an elongated portion having a longitudinal axis. The body further has a lateral circumference, a duct and a pass-through channel. The duct of the body extends along the longitudinal axis through the elongated portion. Further, the duct of the body is dimensioned to receive the microcapillary. The pass-through channel of the body extends between the lateral circumference and the duct.

The term "microcapillary" as used herein relates to microtubes or micropipettes suitable for simulating single-orifice defects. The microcapillaries may be formed of glass or any appropriate plastic material and can have a diameter in the range of approximately 0.1 μm to approximately 500 μm or, more specifically, in the range of approximately 2 μm to approximately 9 μm. A diameter up to about 10 μm or 15 μm may be appropriate for helium leakage testing. A diameter up to about 30 μm may be appropriate for vacuum decay or pressure decay testing Microcapillaries are usually employed as a substitute for smaller-bore, shorter-length leak path when performing tests that rely on gas flow measurements.

The term "lateral circumference" can relate to an outer boundary of the body transverse to the longitudinal axis. It may also include a section of the body with an enlarged diameter, i.e. compared to the elongated portion.

The duct may be embodied in the form of a straight bore configured to precisely enclose the respective microcapillary in order not to allow any gas stream between the outer wall of the microcapillary and the inner surface of the duct. The duct may enclose the microcapillary over substantially its entire length. Usually, only one end of the microcapillary slightly protrudes in to a cavity of the head portion of the holder.

The term "integrity" of a container or package refers to the ability of keeping a content inside the respective container or package and of keeping detrimental environmental contaminants outside the respective container or package. Particularly, when the content is a drug substance or a similar pharmaceutical or chemical substance, integrity can relate to keeping the content sterile inside the container or package. Also, the content may comprise a combination of substances such as a drug substance and a gas, e.g., nitrogen. Environmental contaminants may include microorganisms, reactive gases and other substances.

The pass-through channel of the microcapillary holder allows to apply or provide an adhesive to the microcapillary into the duct such that the microcapillary is tightly fixed in the duct. Like this, the microcapillary can be securely and efficiently handled in pCCI testing such that more reliable results can be achieved.

Preferably, the duct of the elongated portion of the body is dimensioned to hold the microcapillary when the microcapillary is received by the duct. In this manner, it is ensured that the microcapillary has a firm seat and it is prevented that the microcapillary breaks or gets damaged during use.

Thereby, the duct preferably has an inner diameter in a range of about 0.5 mm to about 3 mm, or in a range of about 1 mm to about 2 mm, or of about 1.5 mm. Such dimensions of the duct allow for efficiently and safely holding and positioning microcapillaries widely used in pCCI testing.

The duct preferably has a length in range of about 0.5 cm to about 5 cm, or in a arrange of about 1.5 cm to about 3.5 cm, or in a range of about 2 cm to about 3 cm. Such duct allows for securely holding the microcapillary over a substantial length. Like this a safe holding can be achieved.

Preferably, the pass-through channel of the body opens at the lateral circumference and at the duct. Like this the pass-through channel is conveniently accessible such that an adhesive can efficiently be provided to tightly fix the microcapillary positioned in the duct.

Preferably, the pass-through channel of the body has an inner diameter in a range of about 0.5 mm to about 3 mm, or in a range of about 1 mm to about 2 mm, or of about 1.5 mm. Such dimensions allow for efficient provision of adhesive through the pass-through to the microcapillary arranged in the duct.

Preferably, the elongated portion or the body has an outer diameter in a range of about 4 mm to about 9 mm, or in a range of about 5.5 mm to about 7.5 mm, or in a range of about 6 mm to about 7 mm. Such an elongated portion can be beneficial in many applications and/or for an efficient handling of the fixed microcapillary.

The above dimensions, particularly in sum, have proven to be particularly beneficial for commonly used microcapillaries for pCCI testing.

Preferably, the pass-through channel of the body is essentially orthogonal to the longitudinal axis of the elongated portion of the body. This orientation is particularly advantageous for applying adhesive substances in an efficient manner.

Preferably, the body comprises a head portion from which the elongated portion extends. The elongated portion may serve as connecting portion for a potential adapter. Thus, the elongated portion may comprise a taper at its free end to be conveniently connectable to another structure.

Preferably, the head portion has a cavity to which the duct opens. The cavity may be provided for receiving a filter unit. Like this, the cavity can encase, support and protect the filter unit.

Preferably, the cavity transitions into the duct via a tapering section. In this manner a sophisticate insertion of the microcapillary into the duct can be achieved. In particular, the risk of damaging the microcapillary when being introduced into the duct can be lowered. Furthermore, a gas flow may be improved.

Preferably, the microcapillary holder comprises a nut with a first mounting structure, wherein the head portion of the body has a second mounting structure corresponding to the first mounting structure of the nut such that the nut is mountable to the head of the body by the first mounting structure and the second mounting structure interacting. Thereby, the first and second mounting structures can be embodied as threads, or bayonet closures or the like. In this manner a particularly tight and releasable mounting of a filter unit is possible.

Preferably, the microcapillary holder comprises a filter unit, wherein the filter unit is arranged in the cavity of the head portion of the body such that the duct is covered. This ensures that the gas flows through the filter such that, e.g., contaminations can be kept off the microcapillary.

Preferably, the filter unit is locked in the cavity of the head portion of the body by the nut. In this manner the tight and releasable fit may be further improved.

Preferably, a first gasket is arranged between the filter unit and the head portion of the body. Advantageously, the first gasket is an O-ring. Further preferably, a second gasket is arranged between the filter unit and the nut. Advantageously, the second gasket is an O-ring. The O-rings have proven to provide particularly reliable and tight sealing.

It is noted that the inventive microcapillary holder with the nut may also be applied for permeability measurements. In this case, the dimensions of the microcapillary holder and of the nut may be different from the dimensions used when carrying out CCI tests. In particular, the duct may be somewhat bigger or smaller. Also, in such a case, no pass-through channel for the adhesive would be required.

Preferably, the elongated portion of the body tapers towards a longitudinal end. In this manner the coupling with, e.g., an adapter is facilitated.

In a further aspect, the present invention relates to a pCCI testing system to positive control physical container closure integrity (pCCI) of a packaging. The pCCI testing system comprises a microcapillary, and a microcapillary holder as described above.

The container involved in the pCCI testing system may be any container or package particularly used as primary packaging. For example, the container may be a syringe such as staked-in needle (SIN) or other prefilled syringe (PFS), a cartridge or a vial. Thereby, the term “vial” can relate to vials in the literal sense, i.e., a comparably small vessel or bottle, often used to store pharmaceutical products or pharmaceuticals or medications in liquid, powdered or capsuled form. The vial can be made of a sterilizable material such as glass or plastic such as, e.g., polypropylene. It typically comprises a cover or cap including a sealing such as a rubber stopper or a septum which for many applications is designed to be pierced.

The pCCI testing system of the invention and its preferred embodiments described below allows for achieving at least some of the effects and benefits described above in connection with the microcapillary holder according to the invention and its preferred embodiments.

Preferably, the pCCI testing system comprises an adapter with a first coupling structure configured to be connected to the microcapillary holder, a second coupling structure configured to be connected to a packaging member and a through-hole connecting the first coupling structure to the second coupling structure. Thereby, the packaging member can be the packaging to be tested or a packaging dummy.

Preferably, the first coupling structure of the adapter comprises a seat or opening configured to accommodate a longitudinal end of the microcapillary holder.

Preferably, the adapter has a sealing arrangement configured to seal the connection between the first coupling structure and the microcapillary holder and/or the connection between the second coupling structure and the packaging member.

Advantageously, the sealing arrangement comprises a recess within the adapter and an O-ring arranged within the recess.

Preferably, the pCCI test system comprises an adhesive configured to be delivered into the pass-through channel of the body of the microcapillary holder when the microcapillary is received in the duct of the body of the microcapillary holder such that the microcapillary is fixed in the microcapillary holder. In this manner a firm seat and a sealing may be achieved, i.e. such that no gas may flow between the outer wall of the microcapillary and the inner duct wall. The adhesive may be particularly appropriate or may be adapted to fix the microcapillary to the holder.

Preferably, the pCCI test system comprises a packaging dummy having a receiving structure configured to receive the microcapillary holder. Thereby, the packaging dummy can be shaped in accordance with the involved packaging. Particularly, it can have the shape of a vial, a syringe or a cartridge.

Preferably, the receiving structure of the packaging dummy has a gasket to seal a connection between the packaging dummy and the microcapillary holder. Thereby, the gasket can comprise an O-ring or a similar element. The O-ring can be arranged in a suitable indentation or recess provided in the receiving structure.

In a still further aspect, the present invention relates to a process of positive control of a physical container closure integrity (pCCI) of a packaging. The process comprises at least the steps of: obtaining a microcapillary and a microcapillary holder as described above; arranging the capillary into the duct of the body of the microcapillary holder, and delivering an adhesive into the pass-through channel of the body of the microcapillary holder. Thereby, the microcapillary is fixed to the microcapillary holder and potentially also sealed to the latter.

The process of the invention and its preferred embodiment described below allows for achieving at least some of the effects and benefits described above in connection with the microcapillary holder according to the invention, the pCCI testing system according to the invention and their preferred embodiments described above.

Preferably, the process further comprises the steps of obtaining a packaging member and connecting the microcapillary holder to the packaging member. The packaging member may be a packaging or a dummy whereas a packaging is only a dummy but no original packaging.

BRIEF DESCRIPTION OF THE DRAWINGS

The microcapillary holder according to the invention are described in more detail hereinbelow by way of an exemplary embodiment and with reference to the attached drawings, in which.

DESCRIPTION OF EMBODIMENTS

In the following description certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1A:
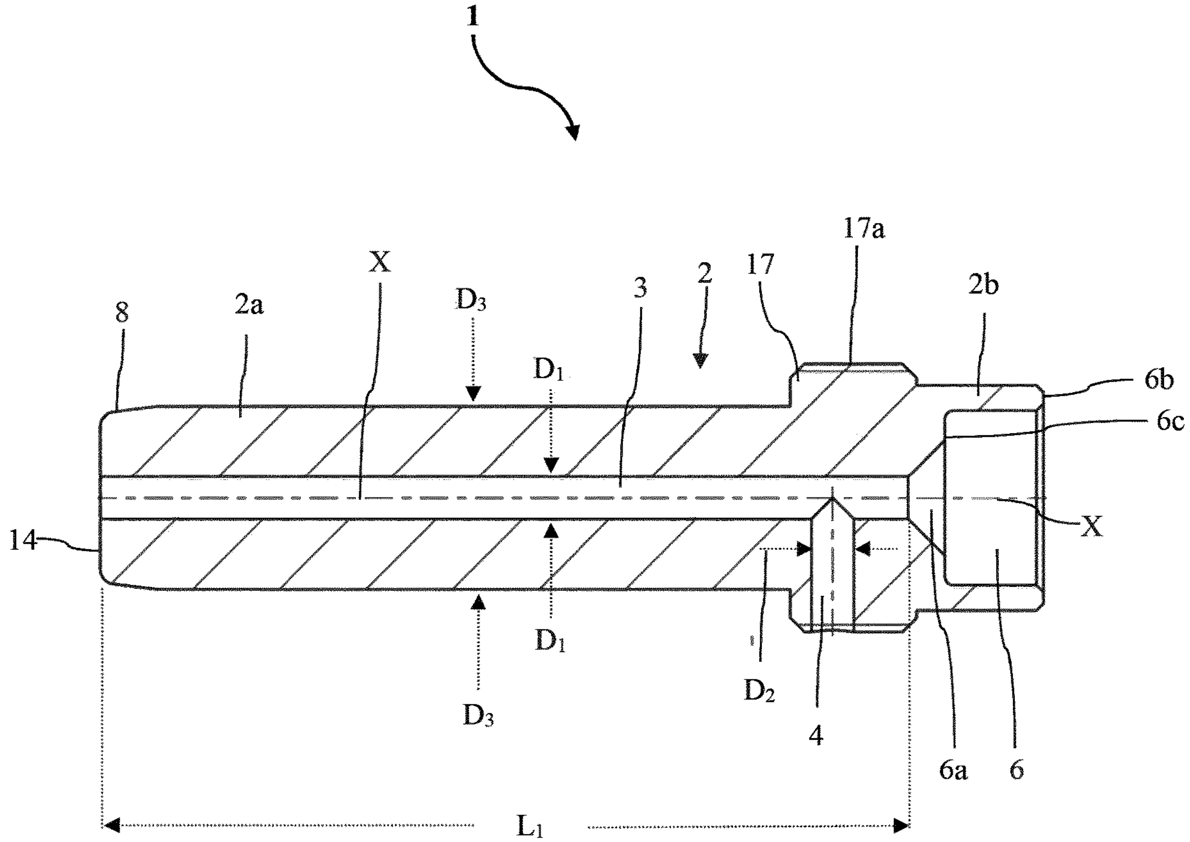
FIG. 1*a* shows a cross-sectional view of a microcapillary holder according to the present invention.

FIG. 1*a* shows a microcapillary holder 1 in accordance with the present invention. The microcapillary holder 1 comprises a body 2 with an elongated portion 2*a* and a head portion 2*b*. The elongated portion 2*a* has a diameter $D_3$ which is usually smaller than the diameter of the head portion 2_b_. The head portion 2_b_ comprises a cavity 6 with a protrusion 6_c_ and a tapering section 6_a_ which joins into a straight duct 3. The duct 3 has a length $L_1$ and extends through the elongated portion 2_a_ along a longitudinal axis X of the microcapillary holder 1. The duct 3 has a diameter $D_1$ which is smaller than the diameter $D_3$ of the elongated portion 2_a_ and smaller than the diameter of the cavity 6. At the free end of the elongated portion 2_a_ there is provided a taper 8. Further, in the head portion 2_b_ there is arranged a pass-through channel 4 which is arranged perpendicularly to the longitudinal axis X and which joins into the duct 3. The pass-through channel 4 has a diameter $D_2$ which may be approximately of the same size as the diameter $D_3$ of the duct 3. However, it may also be somewhat smaller or somewhat larger. Through the pass-through channel 4 an adhesive may be applied in order to fix and/or seal a microcapillary which is received within the duct 3. At the head region 2_b_ of the microcapillary holder 1 there is also arranged a second mounting structure 17 including a thread 17_a_ for receiving a nut 15 (see FIG. 2). The head portion 2_b_ also includes an edge portion 6_b_ which encloses the cavity 6.

Figure 1B:
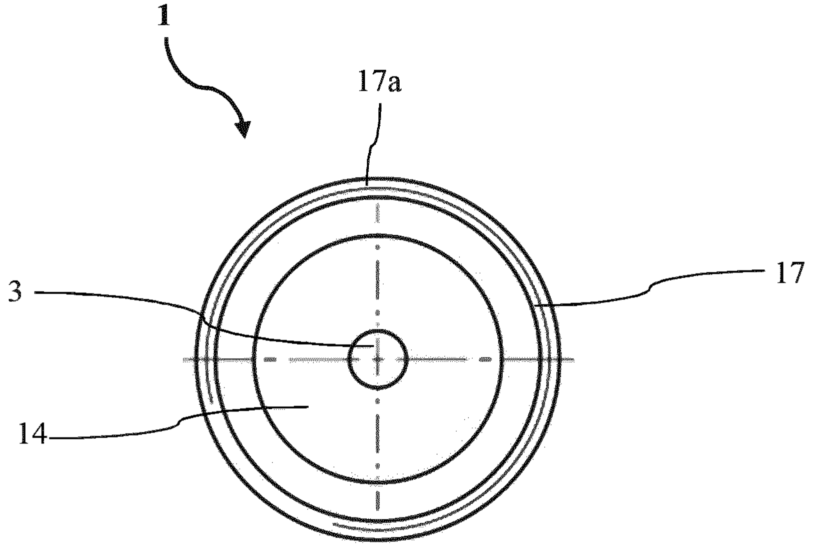
FIG. 1*b* shows a front view of the microcapillary holder of FIG. 1*a;*

FIG. 1_b_ depicts a front view of the elongated portion 2_a_ of the microcapillary holder 1. From outside to inside one can see the second mounting structure 17 respectively the thread 17_a_, a front face 14 of the elongated portion 2_a_ and the duct 3.

Figure 2:
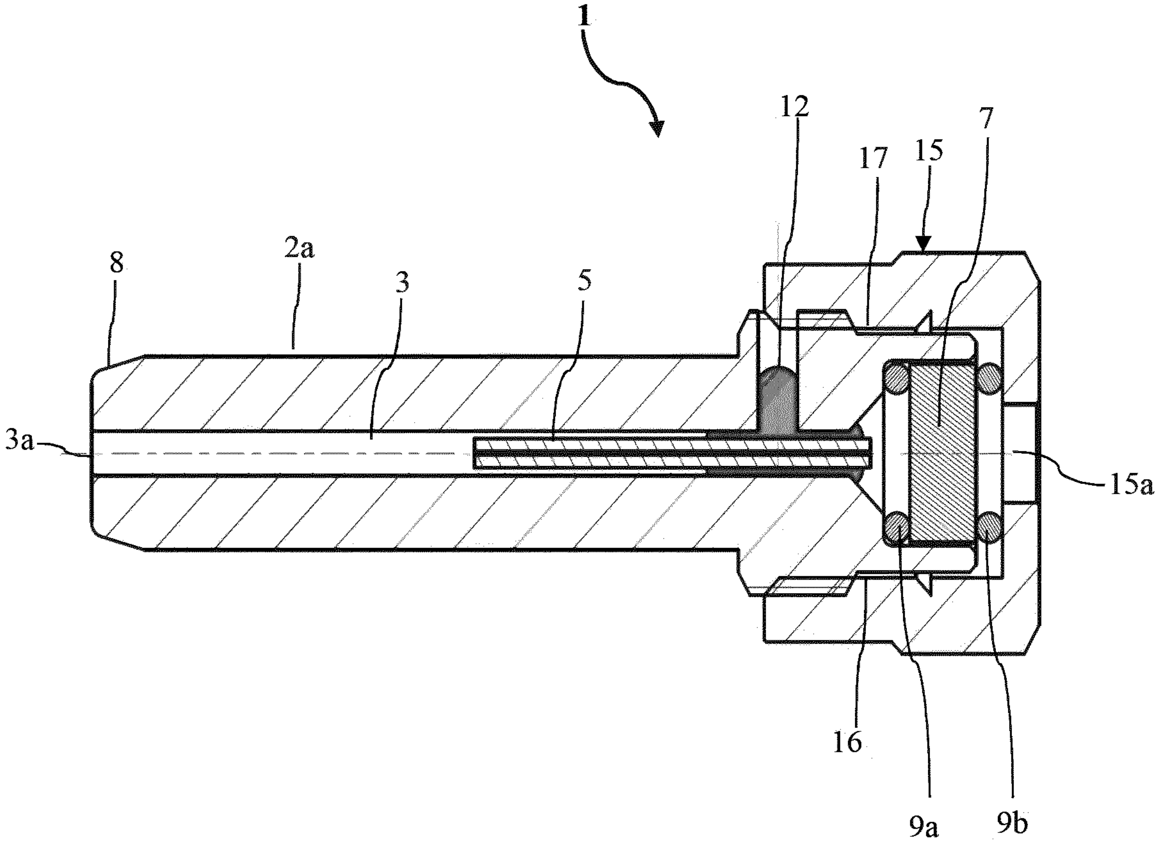
FIG. 2 shows an inventive microcapillary holder receiving a microcapillary and with a nut put on a head portion of the microcapillary holder.

In FIG. 2 the microcapillary holder 1 is shown with the screwed-on nut 15. Thereby, a first mounting structure respectively a thread 16 of the nut 15 interacts with the second mounting structure 17 of the head portion 2_b_ of the microcapillary holder 1. The nut 15 comprises an outlet opening 15_a_ for gas outlet which is centrally arranged in a top or end side of the nut 15. Within the duct 3 of the microcapillary holder 1 there is arranged a microcapillary 5. The microcapillary 5 is partially surrounded by adhesive 12 provided through the pass-through channel 4 such that the microcapillary 5 has a firm seat and is sealed to the duct 3. The right end of the microcapillary 5 slightly extends into the tapering section 6_a_ of the cavity 6. Here, the duct 3 of the microcapillary holder 1 is about twice as long as the microcapillary 5 received within the duct 3. In any case, the microcapillary 5 shall not protrude through the opening 3_a_ of the elongated portion 2_a_ at its free end. Within the cavity 6 of the head portion 2_a_ of the microcapillary holder 1 there is arranged a filter unit 7, preferably in the form of a sinter metal filter, which is clamped by two O-rings 9_a_ and 9_b_ as first and second gaskets in order to achieve a press-fit connection. The filter unit 7 shall provide for a sterile atmosphere. Yet, instead of a filter unit 7 there may also be provided some other material within the cavity 6, e.g., for measuring the gas permeability of said material. For such permeability measurements, the dimensions of the microcapillary holder 1 and of the nut 15 may be different from the dimensions used when carrying out CCI tests. In particular, the duct 3 may be somewhat bigger or smaller. Also, in such a case, no pass-through channel 4 would be required.

Figure 3A:
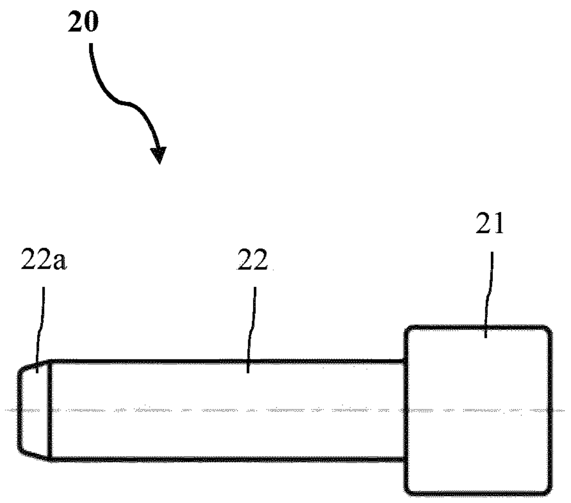
FIG. 3*a* shows a side view of a negative control plug.
Figure 3B:
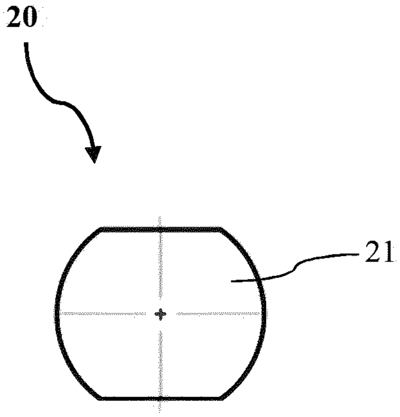
FIG. 3*b* shows a front view of the negative control plug according to FIG. 3*b;*

FIG. 3_a_ illustrates a negative control plug 20, i.e., not having a duct. The negative control plug 20 comprises a head 21 and a shaft 22 with a tapered end 22_a_. FIG. 3_b_ depicts a top view on the head 21 of the negative plug 20 which comprises a trapezoidal shape.

Figure 4:
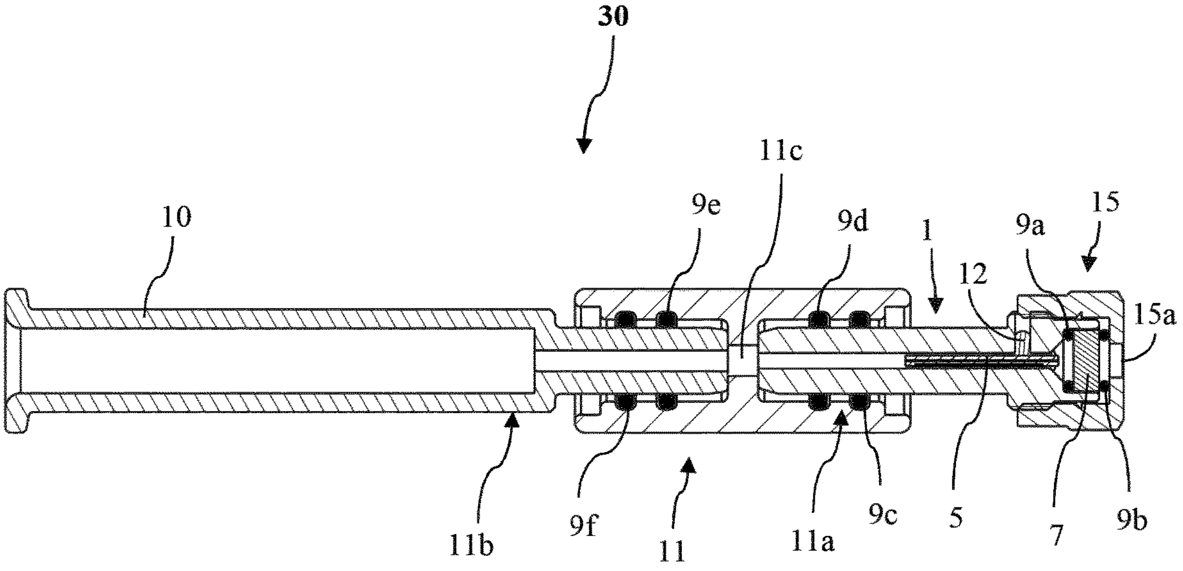
FIG. 4 shows a cross-sectional view of an adapter connecting a microcapillary holder according to the present invention with a positive dummy syringe.

In FIG. 4 there is shown a pCCI testing system 30 to positive control physical container closure integrity (pCCI) of a packaging 10, here in the form of a positive control syringe dummy. The testing system 30 comprises a microcapillary holder 1 with a nut 15 and a microcapillary 5 received within the microcapillary holder 1, an adapter 11 and the positive syringe dummy 10. The adapter 11 comprises a first coupling structure 11_a_ for coupling the microcapillary holder 1 and a second coupling structure 11_b_ for coupling the positive control syringe dummy 10. Seal coupling of the microcapillary holder 1 is achieved by means of two O-rings 9_c_, 9_d_ as third and fourth gaskets and seal coupling of the syringe dummy 10 likewise is achieved by two O-rings 9_e_, 9_f_ as fifth and sixth gaskets. The adapter 11 also comprises a central through hole 11_c_ for connecting the ducts of the microcapillary holder 1 and of the positive control syringe dummy 10 such that gas may flow from the positive control syringe dummy 10 to and through the microcapillary holder 1, the filter unit 7 and the outlet opening 15_a_.

Figure 5A:
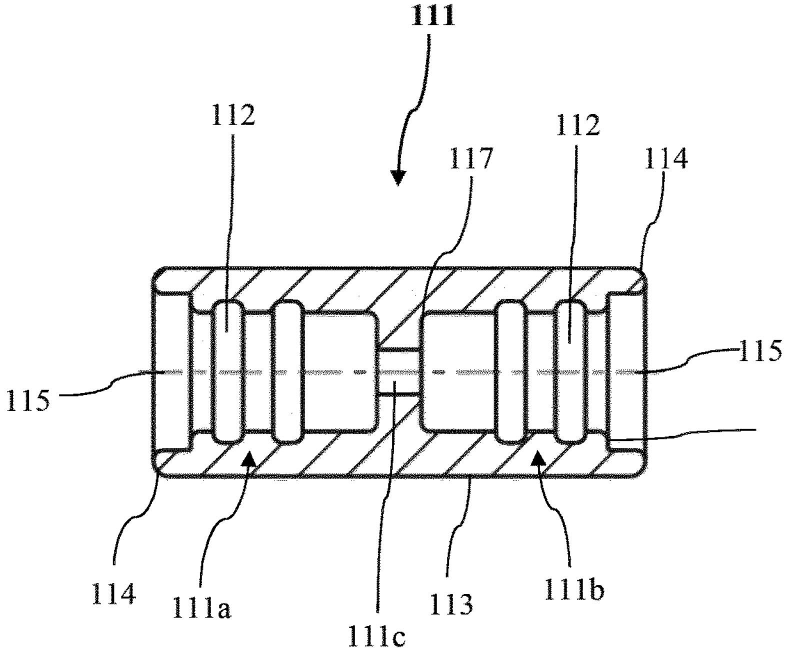
FIG. 5*a* shows a cross-sectional view of an alternative adapter according to the present invention.
Figure 5B:
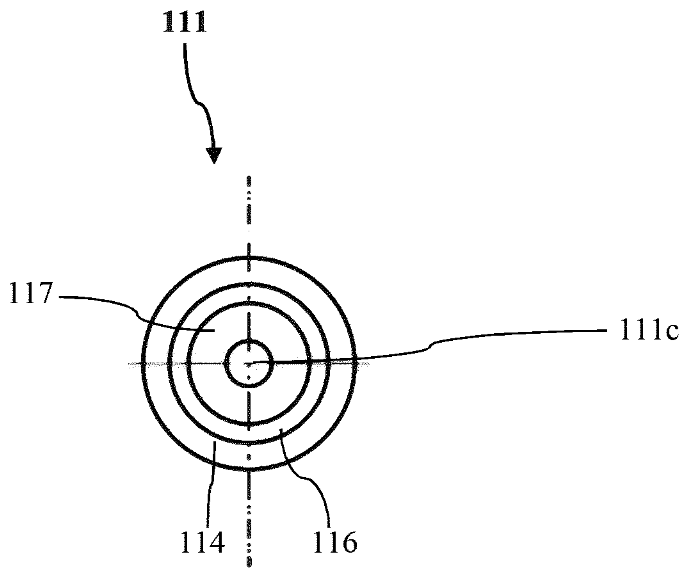
FIG. 5*b* shows a front view of the alternative adapter according to FIG. 5*a;*
Figure 5C:
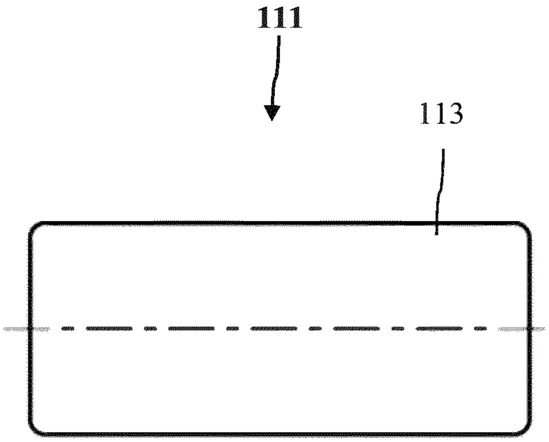
FIG. 5*c* shows a side view of the alternative adapter according to FIG. 5*a;*
Figure 6A:
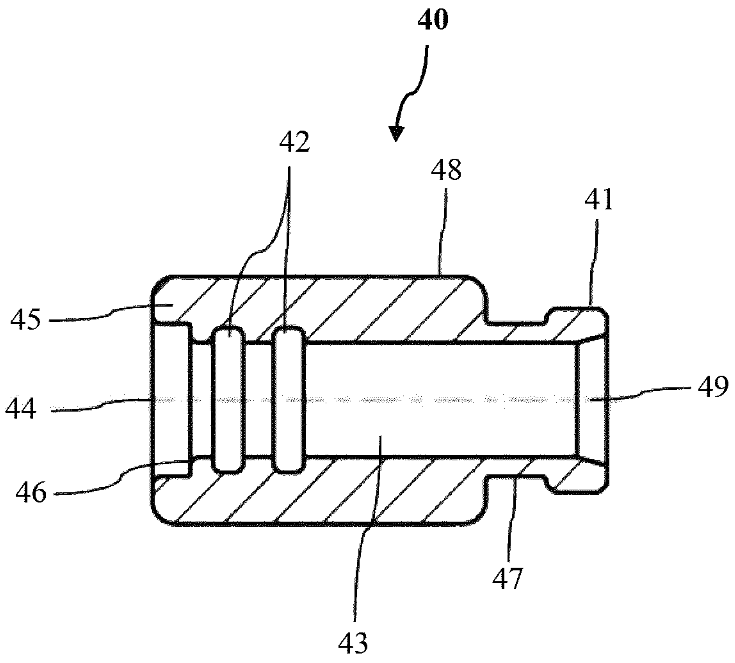
FIG. 6*a* cross-sectional view of a positive control dummy in form of a vial, FIG. 6*b* a front view of the vial dummy according to FIG. 6*a;*
Figure 6B:
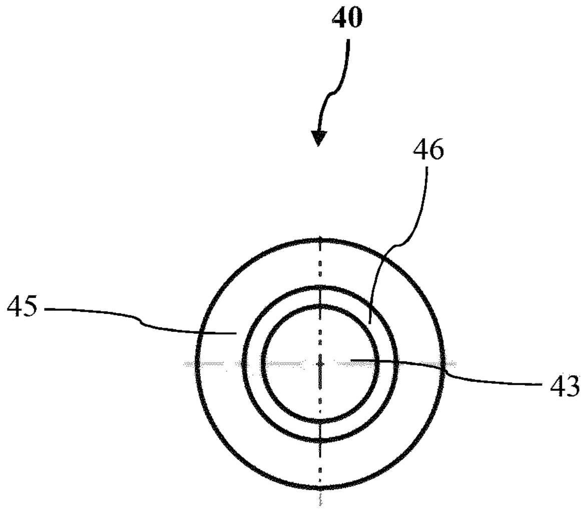
FIG. 6*c* a side view of the vial according to FIG. 6*a;*
FIG. 6*d* shows a cross-sectional view of the alternative adapter according to FIG. 5*a* connecting a microcapillary holder according to the present invention with a positive dummy syringe.
Figure 6C:
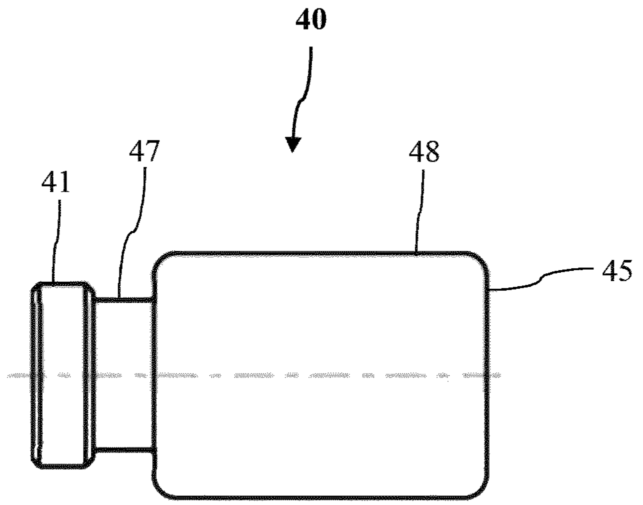
Figure 6D:
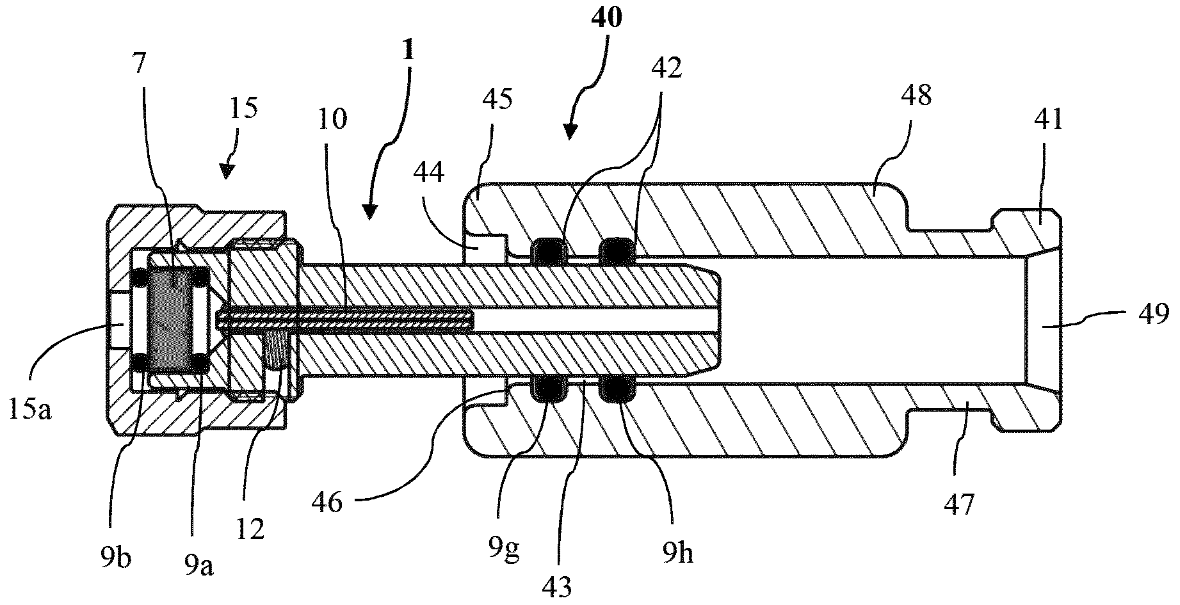

An identical adapter 111 is illustrated in FIG. 5_a_. It comprises a cylindrical outer wall 113. On each side of the adapter 111 there is provided an opening 115 for receiving a positive control dummy and the microcapillary holder 1. There is also provided a through hole 111_c_ connecting the two openings 115. Within each of the openings 115 there are provided two recesses 112 for receiving the O-rings 9_c_, 9_d_, 9_e_, 9_f_ as sealing means. Hereby, the first and second coupling structures 111_a_ and 111_b_ are formed in a tight and firm manner. The adapter 111 provides for an optimal clamping and sealing function. In addition to tightness, the adapter 111 prevents slipping of the dummy 10 and/or the microcapillary holder 1 by friction.

FIG. 5_b_ shows a front view of the adapter 111. From outside to inside one can see the edge 114, a protrusion 116, a protrusion 117 and the through hole 111_c_. FIG. 5_c_ shows the adapter 111 with the cylindrical outer wall in a side view.

A positive control vial dummy 40 is depicted in FIG. 6_a_. The vial dummy 40 comprises at its bottom section an opening 44 surrounded by an edge 45, which opening 44 is formed as coupling structure in correspondence to the openings 115 of the adapter 111 shown in FIG. 5_a_. In other words, the opening 44 comprises two recesses 42 for receiving sealing means or gaskets in the form of O-rings. In this manner, an optimal clamping and sealing function may be provided. The vial dummy 40 further comprises a through opening or channel 43 and a top or end opening 49. A neck portion 47 connects a head 41 with a body 48 of the vial dummy 40. FIG. 6_b_ shows a rear view of the vial dummy 40. From outside to inside one can see the bottom edge 45, a protrusion 46 and the through opening 43. FIG. 6_c_ shows the vial dummy 40 in a side view, with the bottom side, the cylindrical body portion 48 and the neck portion 47 connecting the body portion 48 and the head 41.

In FIG. 6_d_, the positive control vial dummy 40 is shown coupled to the microcapillary holder 1. More specifically, the elongated portion 2_a_ of the microcapillary holder 1 extends into the opening 44 and is clamped or held by the two O-rings 9_g_, 9_h_ arranged in the two recesses 42. Like this, the microcapillary holder 1 is firmly held or coupled in the positive control vial dummy 40 by friction and the outer circumference of the elongated body 2_b_ is tightly connected to the interior wall of the channel 43.

Figure 7A:
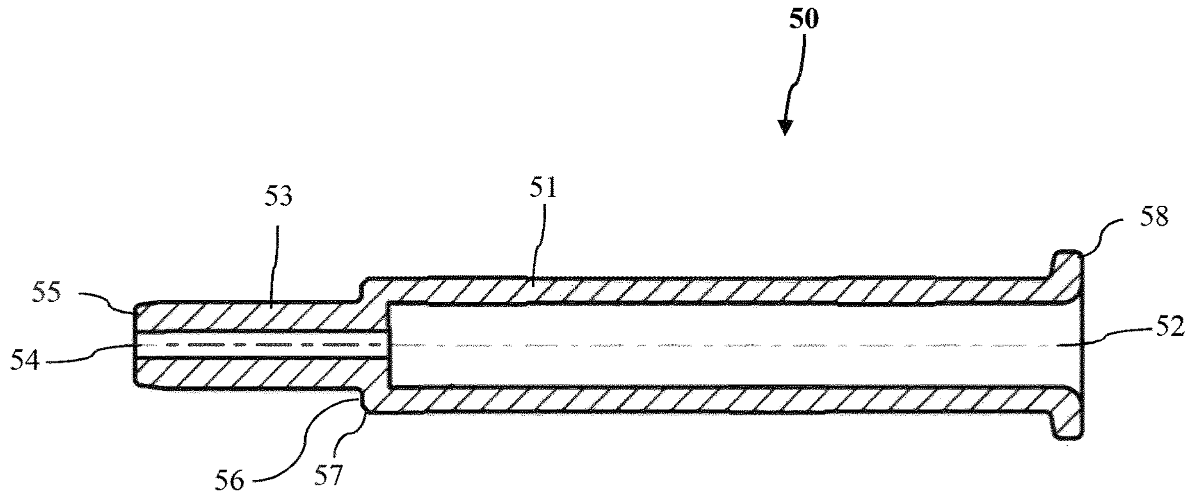
FIG. 7*a* shows a cross-sectional view of a positive control dummy in the form of a syringe.
Figure 7B:
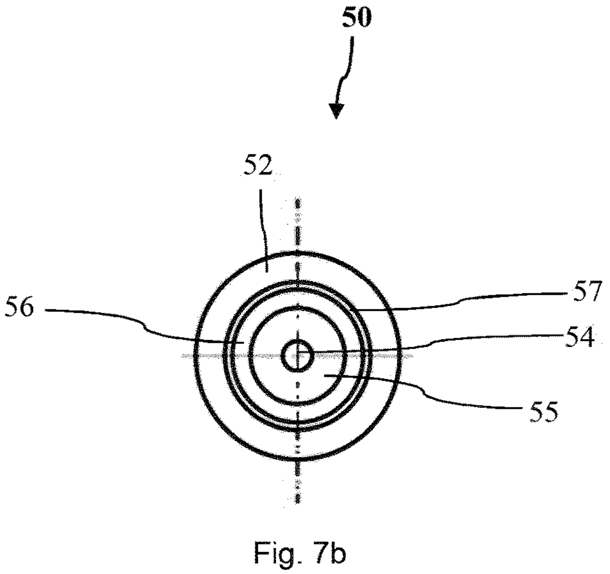
FIG. 7*b* shows a rear view of the syringe dummy according to FIG. 7*a.*

A positive control syringe dummy 50 is depicted in FIG. 7_a_. The syringe dummy 50 comprises a cylindrical body 51 from which a neck portion 53 with a smaller diameter protrudes and which comprises at its rear end, i.e. the end opposite from the neck portion 53, a holding edge 58. The cylindrical body 51 of the syringe dummy 50 encloses a chamber 52. The chamber 52 is followed by the smaller diameter through opening of the neck portion 53. FIG. 7_b_ shows a front view of the syringe dummy 50. From outside to inside one can see the through opening of the head 54, the front face 55 of the neck portion 53, the protrusion 56, the chamfer 57 and the holding edge 58.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range.

Components described as coupled or connected may be electrically or mechanically directly coupled, or they may be indirectly coupled via one or more intermediate components. Any reference signs in the claims should not be construed as limiting the scope.

LIST OF REFERENCE SIGNS

| | | | |
|---|---|---|---|
| 1 | microcapillary holder | 21 | head |
| 2 | body | 22 | shaft |
| 2a | elongated portion | 22a | tapered end |
| 2b | head portion | 30 | pCCI system |
| 3 | duct | 40 | positive control dummy vial |
| 3a | opening | 41 | head |
| 4 | pass-through channel | 42 | recesses (for sealing members) |
| 5 | microcapillary | 43 | through opening |
| 6 | cavity | 44 | opening (bottom) |
| 6a | tapering section | 45 | edge (bottom) |
| 6b | edge portion | 47 | neck |
| 6c | protrusion | 48 | body portion |
| 7 | filter unit | 49 | top opening |
| 8 | taper | 50 | positive control dummy syringe |
| 9a | first gasket | 51 | body |
| 9b | second gasket | 52 | chamber |

-continued

| | | | |
|---|---|---|---|
| 9c | third gasket | 53 | neck |
| 9d | fourth gasket | 54 | through opening (neck) |
| 9e | fifth gasket | 55 | front face |
| 9f | sixth gasket | 56 | edge (body) |
| 9g | seventh gasket | 57 | chamfer |
| 9h | eighth gasket | 58 | holding edge |
| 10 | packaging (syringe) | 111 | adapter |
| 11 | adapter | 111a | first coupling structure |
| 11a | first coupling structure | 111b | second coupling structure |
| 11b | second coupling structure | 111c | through hole |
| 11c | through hole | 112 | recesses (for sealing members) |
| 11d | indentation | 113 | cylindrical outer surface |
| 12 | adhesive | 114 | edge |
| 13 | seat | 115 | opening |
| 14 | front face | 116 | protrusion |
| 15 | nut | 117 | protrusion |
| 15a | outlet opening | $D_1$ | inner diameter duct |
| 16 | first mounting structure nut | $D_2$ | inner diameter pass through channel |
| 17 | protrusion | $D_3$ | outer diameter elongated portion |
| 17a | second mounting structure | $L_1$ | length duct |
| 18 | packaging dummy | X | longitudinal axis |
| 18a | receiving structure | | |
| 20 | negative plug | | |
| 46 | protrusion | | |

The invention claimed is:

1. A physical container closure integrity (pCCI) testing system to positive control physical container closure integrity of a packaging, comprising:

a microcapillary;

an adhesive; and a microcapillary holder for holding a microcapillary during positive control physical container closure integrity testing of a packaging, comprising a body with an elongated portion having a longitudinal axis, wherein the body of the microcapillary holder has a lateral circumference, a duct and a pass-through channel, and wherein the duct of the body of the microcapillary holder extends along the longitudinal axis through the elongated portion, and wherein the duct of the body of the microcapillary holder is dimensioned to receive the microcapillary, and wherein the pass-through channel of the body of the microcapillary holder extends between the lateral circumference and the duct, and wherein the microcapillary is received in the duct of the body of the microcapillary holder, and wherein the adhesive is delivered into the pass-through channel of the body of the microcapillary holder such that the microcapillary is tightly fixed in the microcapillary holder.

2. The pCCI testing system of claim 1, wherein the duct of the elongated portion of the body of the microcapillary holder is dimensioned to hold the microcapillary when the microcapillary is received by the duct.

3. The pCCI testing system of claim 1, wherein the pass-through channel of the body of the microcapillary holder opens at the lateral circumference and at the duct.

4. The pCCI testing system of claim 1, wherein the body of the microcapillary holder comprises a head portion from which the elongated portion extends.

5. The pCCI testing system of claim 4, wherein the head portion has a cavity to which the duct opens.

6. The pCCI testing system of claim 5, wherein the cavity transitions into the duct via a tapering section.

7. The pCCI testing system of claim 5, comprising a nut with a first mounting structure, wherein the head portion of the body has a second mounting structure corresponding to the first mounting structure of the nut such that the nut is mountable to the head of the body of the microcapillary holder by the first mounting structure and the second mounting structure interacting.

8. The pCCI testing system of claim 7, comprising a filter unit, wherein the filter unit is arranged in the cavity of the head portion of the body of the microcapillary holder such that the duct is covered.

9. The pCCI testing system of claim 8, wherein the filter unit is locked in the cavity of the head portion of the body of the microcapillary holder by the nut.

10. The pCCI testing system of claim 1, comprising;

an adapter with a first coupling structure configured to be connected to the microcapillary holder;

a second coupling structure configured to be connected to a packaging member; and a through-hole connecting the first coupling structure to the second coupling structure.

11. The pCCI testing system of claim 10, wherein the adapter has a sealing arrangement configured to seal the connection between the first coupling structure and the microcapillary holder.

12. The pCCI testing system of claim 10, wherein the adapter has a sealing arrangement configured to seal the connection between the second coupling structure and the packaging member.

13. The pCCI testing system of claim 10, wherein the adapter has a sealing arrangement configured to seal the connection between the first coupling structure and the microcapillary holder and the connection between the second coupling structure and the packaging member.

14. The pCCI testing system of claim 1, comprising a packaging dummy having a receiving structure configured to receive the microcapillary holder.

15. The pCCI testing system of claim 14, wherein the receiving structure of the packaging dummy has a gasket to seal a connection between the packaging dummy and the microcapillary holder.

16. The pCCI testing system of claim 1, wherein the pass-through channel of the body of the microcapillary holder is essentially orthogonal to the longitudinal axis of the elongated portion of the body.

17. A process of positive control of a physical container closure integrity (pCCI) of a packaging, the process comprising:

obtaining a microcapillary and a microcapillary holder for holding the microcapillary during positive control physical container closure integrity testing of a packaging, comprising a body with an elongated portion having a longitudinal axis, wherein the body of the microcapillary holder has a lateral circumference, a duct and a pass-through channel, and wherein the duct of the body of the microcapillary holder extends along the longitudinal axis through the elongated portion, and wherein the duct of the body of the microcapillary holder is dimensioned to receive the microcapillary, and wherein the pass-through channel of the body of the microcapillary holder extends between the lateral circumference and the duct;

arranging the microcapillary into the duct of the body of the microcapillary holder; and delivering an adhesive into the pass-through channel of the body of the microcapillary holder.

18. The process of claim 17, comprising:

obtaining a packaging member; and connecting the microcapillary holder to the packaging member.

* * * * *